Oct. 29, 1940. W. POOL 2,220,024
MANUFACTURE OF STAPLE FIBER YARNS
Original Filed Oct. 9, 1937   7 Sheets-Sheet 2

INVENTOR:
WILLIAM POOL
by
Attorneys

Oct. 29, 1940.     W. POOL     2,220,024
MANUFACTURE OF STAPLE FIBER YARNS
Original Filed Oct. 9, 1937     7 Sheets-Sheet 3

INVENTOR:
WILLIAM POOL
by
J Seltzer and his Johnson
Attorneys

Oct. 29, 1940.  W. POOL  2,220,024
MANUFACTURE OF STAPLE FIBER YARNS
Original Filed Oct. 9, 1937  7 Sheets-Sheet 4

INVENTOR:
WILLIAM POOL
Attorneys

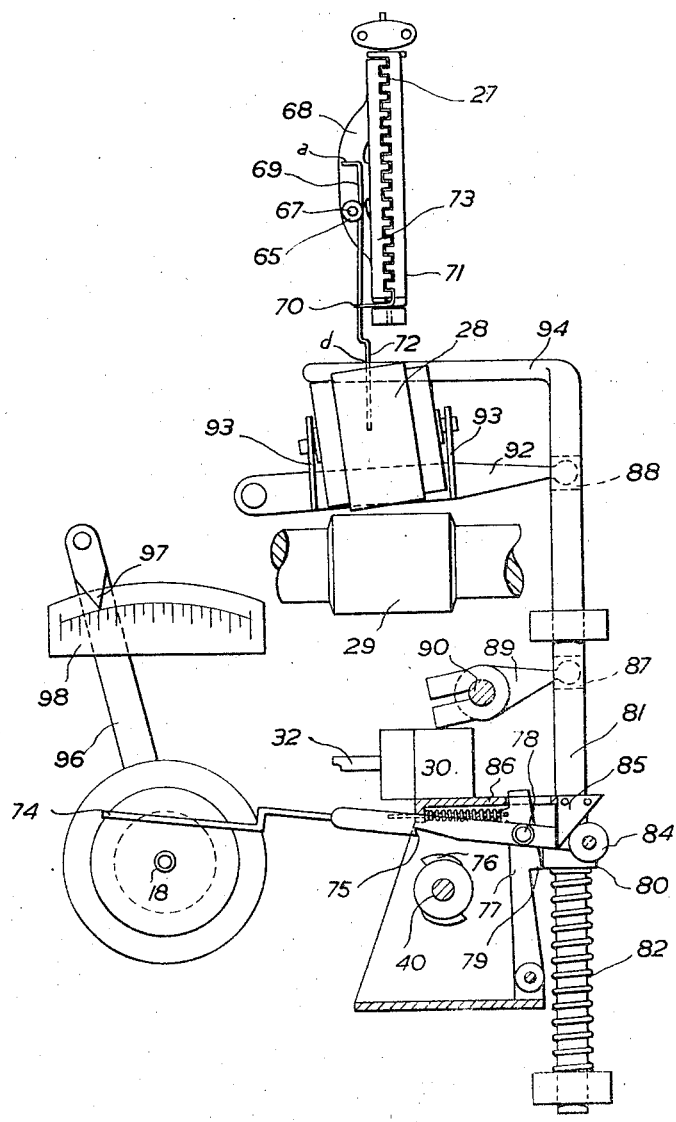

Oct. 29, 1940.   W. POOL   2,220,024
MANUFACTURE OF STAPLE FIBER YARNS
Original Filed Oct. 9, 1937   7 Sheets-Sheet 7
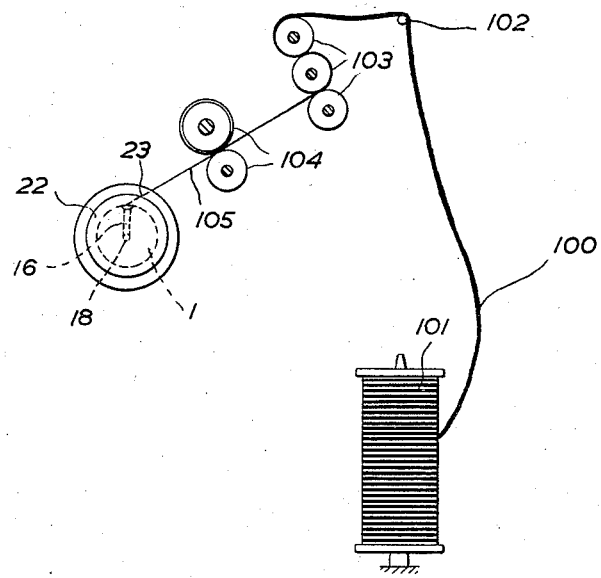
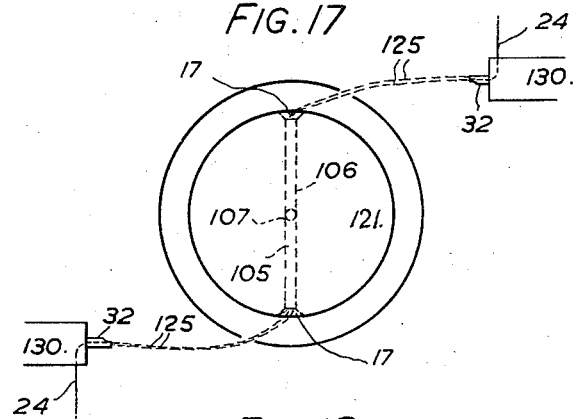
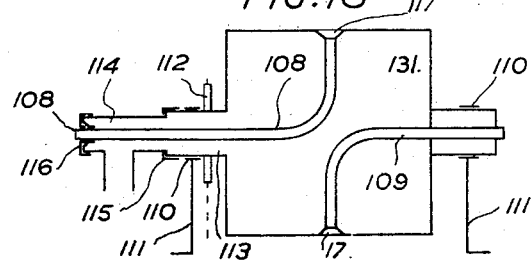
Inventor:
WILLIAM POOL
by
Attorneys Patented Oct. 29, 1940

2,220,024

UNITED STATES PATENT OFFICE 2,220,024

MANUFACTURE OF STAPLE FIBER YARNS

William Pool, Spondon, near Derby, England, assignor to Celanese Corporation of America, a corporation of Delaware Application October 9, 1937, Serial No. 168,135. Renewed September 1, 1939. In Great Britain October 21, 1936

22 Claims. (Cl. 57—2)

This invention relates to the manufacture of staple fiber products.

According to the invention, a continuous staple fiber product is formed by feeding to the peripheral surface of a rotating drum a succession of groups of separated fibers, holding each group of fibers to the surface of the drum by means of suction, and withdrawing the succession of groups of fibers through a passage leading to the axis of the drum so that the forward ends of fibers of each group extend beyond the rearward ends of fibers of the preceding group to such an extent that the twist inserted by the rotation of the drum unites the successive groups of fibers into a continuous twisted staple fiber product. While the suction serves to hold the fibers to the surface of the drum and to enable consecutively presented fibers to be built up into a continuous product, it does not interfere with the sliding of the fibers over the surface of the drum as they are withdrawn continuously with the insertion of twist.

A suitable form of apparatus for carrying out the above process comprises a rotatable drum, means for rotating the drum, means by which suction can be applied to the interior of the drum, a passage terminating at one end in an opening in the peripheral surface of the drum and leading to the axis of the drum, the surface of the drum being permeable at least in the neighbourhood of the opening, means for feeding to the surface of the drum a succession of groups of separated fibers, and means for withdrawing from the axis of the drum the continuous twisted staple fiber product produced by the rotation of the drum operating on the successive groups of fibers held to the surface of the drum by the suction.

The suction may be applied to the interior of the drum by any suitable means, e. g. by means of a passage running through a bearing in which the drum rotates, such arrangement enabling the holding of the fibers to be effected continuously throughout the rotation of the drum without the use of extraneous mechanical means that might interfere with the smooth running of the drum. Consequently, the drum is capable of operating at very high rates of rotation.

In order to render the drum permeable, it may be pierced by a series of small holes communicating with an interior chamber to which the suction is applied. Similar holes may be formed in the mouth of the passage by which the built-up fibers are conducted to the axis of the drum.

While only one suction point or zone may be provided on the drum, two or more such points or zones with corresponding passages leading to the axis of the drum may be provided to operate with a corresponding number of means for presenting the fibers to the drum, the two or more built-up products being either united as they pass to the axis and twisted together into a single product, or withdrawn separately from opposite sides of the drum.

The fibers may be presented to the drum as a preformed staple fiber product such as a roving, from the end of which a succession of groups of fibers are withdrawn for feeding to the drum. One or more pairs of feed rollers may be used to withdraw the fiber groups and present them to the point at which the suction is applied to hold the fibers. In this case, the invention serves to convert the roving into a twisted product of a count whose relation to the count of the original roving depends upon the respective rates of feed and delivery of the staple fiber material to and from the drum. By suitable choice of these rates, the count of the original roving, and the rate at which twist is inserted, there may be obtained in the one operation the weight and twist appropriate to the use for which the product is intended. The component filaments of a substantially twistless bundle of associated continuous filaments may be separated one from the other at the end of the bundle and fed towards the drum and cut into groups of separated fibers of predetermined length, e. g. by means of the cutting device described in U. S. application S. No. 155,949 filed July 27, 1937. As each group of fibers is severed from the ends of the continuous filaments, the fibers are held by the suction to the drum, the successive groups being built up into a continuous product which emerges in twisted form from the axis of the drum.

The bundle of associated continuous filaments to be converted into the staple fiber product may take the form of a band or thread of untwisted filaments or of a thread having a very low degree of twist, but in the latter case, the degree of twist must be sufficiently low to enable the component filaments to be separated one from the other. The expression "substantially twistless" used in connection with the bundle means that the bundle contains no twist or that if any twist is present in the bundle, it should be insufficient to hinder free separation one from the other of the component filaments at the end of the bundle.

The degree of twist in the final product depends upon the rate of delivery and the rate of rotation of the drum. Similarly, the count of the product depends upon the rate of delivery in relation to the rate at which the groups of fibers are fed to the drum.

It is important that the consecutive groups of fibers should be intermingled with each other in order to impart strength to the product. With this object in view the fibers of consecutive groups overlap each other so that the groups are twisted together. Advantageously the bundles of filaments are so cut that the ends of the groups of fibers are in staggered relation, e. g. by cutting the bundle of filaments at an oblique angle. Alternatively or in addition, overlapping of the groups as a whole may be provided for by suitably arranging the rate of feed of the groups to the drum in relation to the rate of withdrawal of the groups from the drum.

It is particularly important that the continuous filaments should be fed to the drum substantially parallel to each other but in separated condition, i. e. without any large proportion of the total number of filaments remaining for any substantial part of their length in close contact with each other. Thus, the filaments are preferably separated in such a way that they can be fed to the cutting device as a flat band so as to enable the cut ends of the fibers to be substantially spaced from each other, an arrangement that is specially advantageous when the cutting is effected obliquely to the length of the filaments. The successively produced groups are then collected in this separated flattened form on the drum so that as group follows group the fibers of the several groups are in a position to be uniformly distributed in the final product.

The filaments may be brought into their separated condition as they are fed to the cutting device. Thus, for example, they may be subjected to the action of a gaseous blast that serves to blow them apart and at the same time feed them to the cutting device. For example, the filaments may be led through an ejector nozzle having a flat, flared orifice pointing towards the cutting device, and supplied with compressed air, the filaments fanning out as they leave the nozzle.

Electrification may also be employed to aid in the separation of the filaments, e. g. in the case of cellulose acetate filaments. Thus, the filaments may be drawn by feed rollers from the supply and through a gate-tension device which electrifies the filaments by friction. The material of the feed rollers should have such a position in the electrostatic series as not to neutralize materially any of the electrification thus set up. For example, with a metal gate-tension, gutta-percha feed rollers may be used.

Feeding of the filaments is synchronized with the operation of the cutter, a suitable valve being provided for the ejector nozzle. The cutter is located between the nozzle and the drum and the filaments are deflected into the cutter after the required length of separated filaments has been fed. It is preferable to drive the drum through toothed gearing to ensure that it is properly positioned to receive the bunches of fibers when the latter are presented.

From the drum, the product proceeds to a take-up device, which, because the product is already twisted, need not be a twisting device.

While the withdrawing of fibers from a roving or the like or the cutting of fibers from continuous filaments must be synchronous with the rotation of the drum, the presentation of groups of fibers need not take place once for each revolution of the drum. For example, the drum may make several revolutions between each presentation of fibers, each revolution serving to impart one turn of twist to the product.

The suction applied to the drum offers a very simple means for starting up the operation. With the operative's finger closing the passage at the surface of the drum, a length of thread is presented to the outlet end of the passage, and is sucked through the passage and held in position by the suction. If necessary, a short end of the thread can be pulled out of the passage, to be held by the permeable surface of the drum ready to be overlaid by the next presented group of fibers.

A detector feeler may be arranged to declutch the drum and release the feed rollers in the event of thread breakage.

It has been observed that the twist in the product issuing from the axial passage in the drum is distributed in an unusual manner among the several fibers making up the cross-section of the product. Thus, if the product is untwisted, for example in a twist tester, it is seen that the outermost fibers lose all their twist before the core fibers, so that if untwisting proceeds further the outermost fibers become twisted in a reverse direction while the core fibers are continuing to lose twist. Apparently this distribution of twist is brought about by the free end of each group of fibers rotating as a whole while its forward end overlapped with the preceding bunch is being twisted into the preceding bunch. As a result the product is not easily pulled apart by untwisting.

The invention will now be described in greater detail with reference to the accompanying diagrammatic drawings, in which—

Figs. 11 and 12 are front elevations illustrating the operation of stop mechanism shown in Fig. 1;

Figs. 16 to 18 are diagrammatic illustrations of further forms of apparatus for carrying out the invention.

Figure 1:
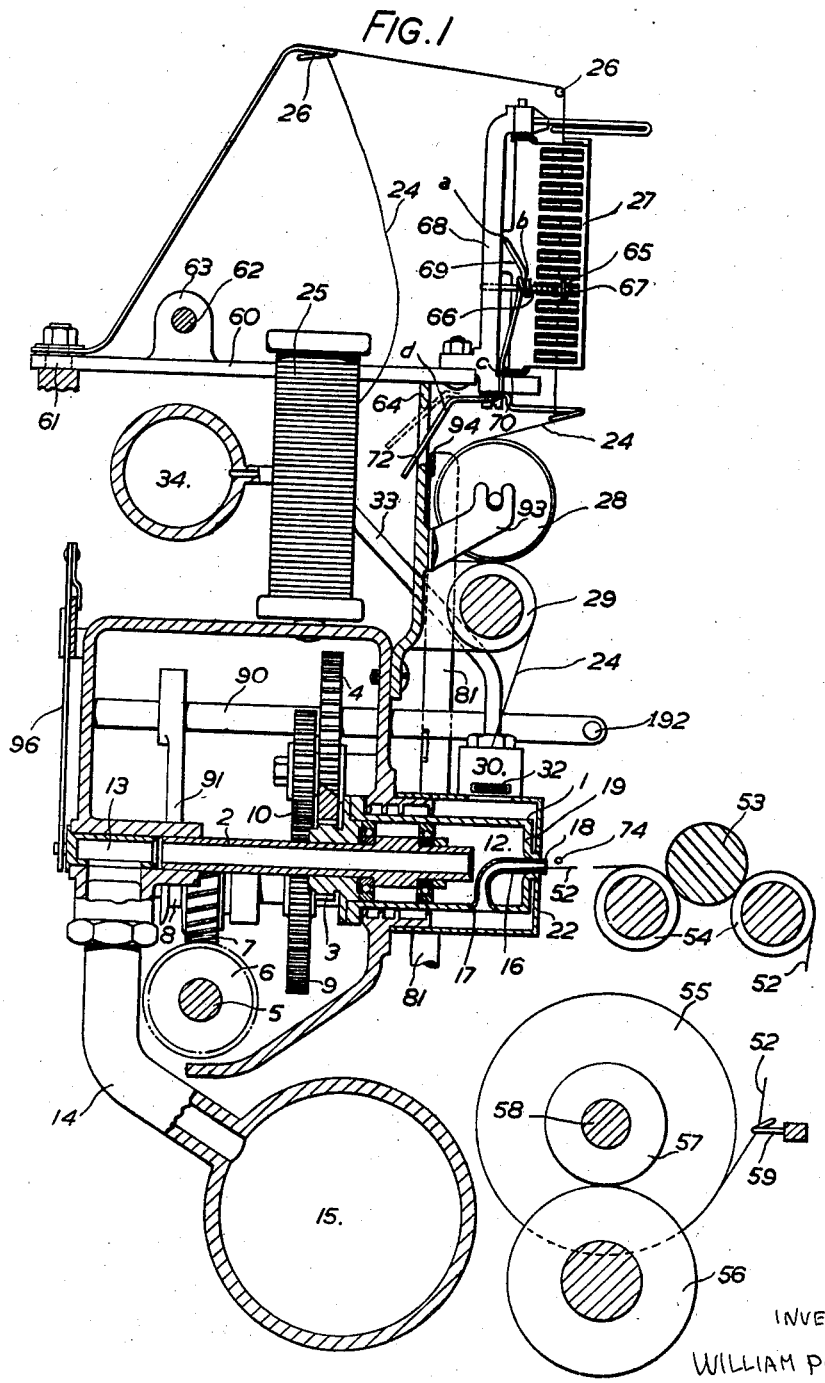
Fig. 1 is a vertical, longitudinal section through the drum showing part of the driving gear.

Referring to Fig. 1, a drum 1 is mounted for rotation on a horizontal spindle 2, the drum being connected to a gear 3 meshing with a larger gear 4. Driven from a shaft 5 through skew gears 6, 7 is a clutch 8 and gears 9, 10, the gear 10 driving the gear 4, and hence, the drum.

Figure 4:
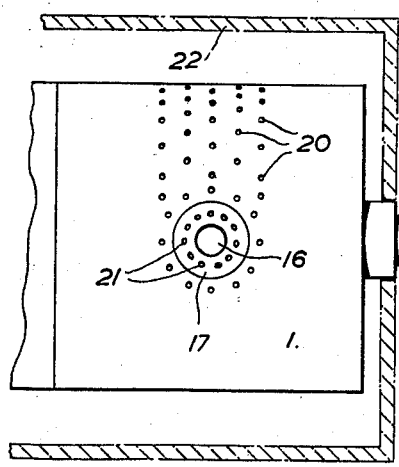
Fig. 4 is a part cross-sectional plan view of the drum and an associated casing.
Figure 5:
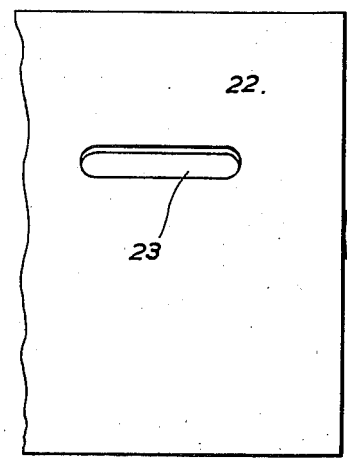
Fig. 5 is a plan view of the casing associated with the drum.

The interior 12 of the drum 1 communicates through the spindle 2 and a valve 13 with a pipe 14 leading from a suction conduit 15. A tube 16 having a flared opening 17 at the surface of the drum 1 is bent at right angles into the axis of the drum to emerge at 18 from the closed end 19 of the drum. Rearward of the opening 17 of the tube 16 the surface of the drum is pierced with a number of fine holes 20 (see Fig. 4), further holes 21 being formed inside the flared opening, these holes providing communication for the suction in the space 12 of the drum with the exterior of the drum. The drum rotates within a stationary casing 22 (Figs. 1 and 5) provided on top with a narrow opening 23 running in the axial direction of the drum.

A bundle 24 of continuous filaments having little or no twist is supplied from a bobbin 25 via guides 26 and a gate tension device 27 to feed rollers 28, 29, of which the former is loosely mounted to rest on the latter which is driven at the desired feed rate. The filaments 24 pass downwards from the roller 29 to a feed device 30 formed with a filament entrance hole 31 (see Figs. 6 and 7) and a flat flared ejecting nozzle 32, pointing horizontally towards and tangentially to the casing 22 in which the drum 1 rotates. Compressed air is supplied to the feed device 30 by a pipe 33 leading from a conduit 34.

Figure 6:
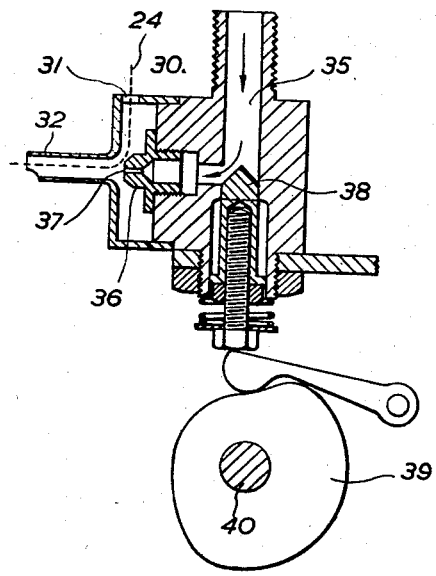
Figs. 6 and 7 are part cross-sectional elevation and plan views, respectively of the feed device.
Figure 7:
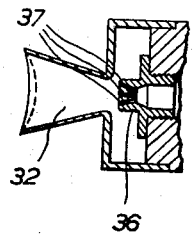

As indicated by arrows in Fig. 6 the air proceeds downwardly along a passage 35 and through a jet 36 to the nozzle 32, the jet being formed with three diverging passages 37 in order to spread the blast of air as it passes through and out of the nozzle, the flat flared shape of which assists in flattening and spreading the blast fanwise.

The passage of the air from the jet 36 to the nozzle 32 creates suction at the filament entrance hole 31 with the result that the filaments 24 are sucked through the hole and into the main air current which serves both to eject the filaments through the nozzle 32 and to separate the filaments one from the other in the form of a substantially flat band during the ejection, any slight degree of twist in the bundle being freed under the influence of the air blast. The bundles of filaments should not contain a finish that prevents the air blast from separating the filaments, and for this reason it is desirable to employ unlubricated filaments.

The air passing from the conduit 35 to the jet 36 is controlled by a valve 38 which is caused to open and close at intervals by a cam 39 mounted on a shaft 40. In this manner the filaments 24 are ejected from the nozzle 32 at intervals for a reason which will be apparent later.

Figure 8:
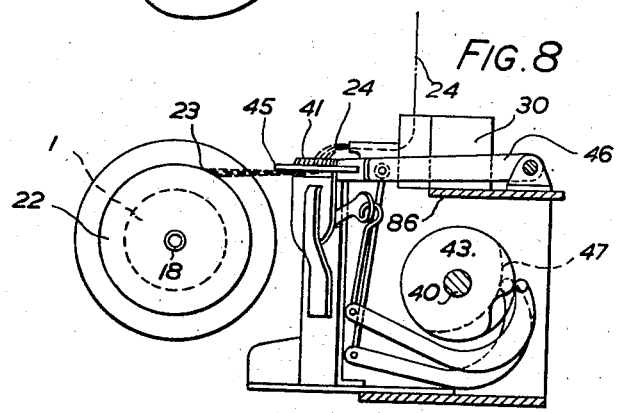
Fig. 8 shows a cutting device associated with the feed device.
Figure 9:
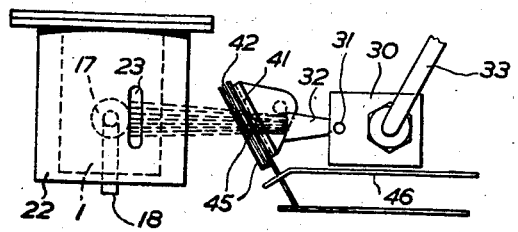
Fig. 9 is a plan view of the mechanism shown in Fig. 8.

As shown in Figs. 8 and 9 a cutting device 41 of the hair clipper type is disposed between the nozzle 32 and the casing 22 with its upwardly pointing teeth slightly below the level of the nozzle and with its moving blade 42 operated by a cam 43 on the shaft 40. The cutting device is inclined to the path of the filaments between the nozzle 32 and the casing 22 and a pair of deflector arms 45, mounted on a lever 46 are similarly inclined, so that on depression of the lever an arm passes to each side of the cutting device. The deflector lever 46 is operated by a cam 47 on the shaft 40.

The rollers 28, 29 feed the filaments 24 from the bobbin 25 at a steady rate, and air admitted by the valve 38 to the feed device 30 expels the filaments through the flared nozzle 32 until their free ends lie substantially above the opening 23 in the casing 22. The suction introduced inside the drum 1 and communicating through the holes 20, 21 with the inside of the casing 22 draws the ends of the filaments through the opening 23 into engagement with the surface of the drum (Fig. 8). At this moment the rotation of the cam 39 causes the valve 38 to close and thus momentarily stop the feed of the filaments 24 through the nozzle 32.

With the ends of the filaments 24 thus held, the deflector arms 45 then descend and bring the filaments into the teeth of the cutting device 41 (Fig. 10), which severs fibers of a predetermined length from the filaments 24 just as the rotation of the drum brings the flared opening 17 into substantial registry with the opening 23 in the casing 22, the oblique disposition of the cutting device staggering the ends of the fibers with respect to the length of the fiber bundle. When the fibers are severed they are drawn by the rotation of the drum 1 through the opening 23 to the inside of the casing 22 where they cling to the surface of the drum, their leading ends being disposed at or near the flared opening 17 of the tube 16.

Figure 10:
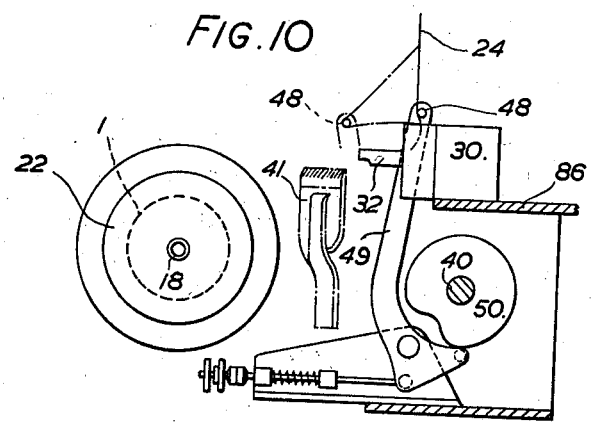
Fig. 10 is a view corresponding to Fig. 8 showing further mechanism in association with the feed device.
Figure 13:
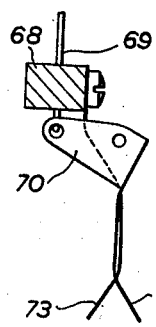
Figs. 13 and 14 are plan views of the tension device shown in Figs. 1, 11 and 12.
Figure 14:
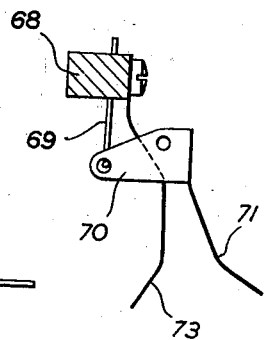
Figure 15:
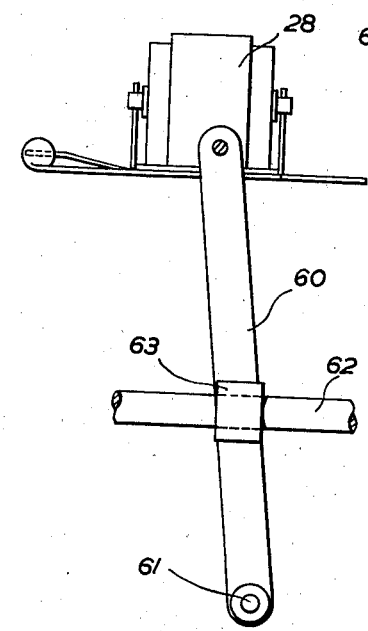
Fig. 15 is a plan view of a further detail of Fig. 1.

A horizontal arm 48 mounted on a lever 49 operated by a cam 50 on the shaft 40 moves from right to left (as seen in Fig. 10) to draw the newly cut ends of the filament clear of the teeth of the cutting device 41 and back into the nozzle 32, after which the valve 38 re-opens to deliver a further length of filaments fed by the rollers 28, 29 through the nozzle 32 for the cutting of a further group of fibers.

As a group of fibers is held to a surface of the drum 1 the leading ends of the fibers overlap fibers of a preceding group which have passed into the tube 16 to emerge from its outlet 18 as a continuous staple fiber product 52, which is drawn away from the drum at a predetermined rate by means of a roller 53 resting on two driven rollers 54. By reason of the rotation of the drum 1 twist is imparted to the product 52 and the running back of twist along the tube 16 causes the leading ends of a group of fibers to be twisted in to the staple fiber product. At the same time the rollers 53, 54 draw the fibers into the tube 16, so that a successive group of fibers overlaps the fibers of the group previously formed, with the result that the fibers are gradually built up into the continuous product 52.

From the second roller 54 the continuous product 52 is cross-wound on a package 55 driven by a wheel 56 engaging a wheel 57 mounted on the package spindle 58, the product being traversed to and fro along the length of the package by a guide 59. For convenience of illustration the winding mechanism is shown to be nearer to the conduit 15 than actually is the case.

In the arrangement shown in the drawings suction is applied to the drum 1 continuously throughout the revolution of the drum. Such continuous application, however, does not interfere with the passage of the fibers over the surface of the drum but serves to hold the fibers evenly during their movement. The control afforded by the suction enables the drum to be rotated at high speeds without danger of the fibers becoming unmanageable during the product-forming operation.

In order to secure good intermingling of the fibers of one group with the fibers that they overlap, it is important that the fibers in each group should be separated from each other. As explained above, this is effected by mechanical action of the air which serves to feed the filaments 24 through the nozzle 32, the flared end of the nozzle assisting in the separation. The filaments 24 are thus separated one from the other and brought more or less individually into the teeth of the cutting device 41, so that when the fibers are cut from the ends of the filaments they form a group of substantial width which spreads itself over the width occupied by the holes 20, 21 in the drum 1. Then as the twist in the product runs back along the tube 16 the leading ends of the newly deposited group of fibers are twisted into the end of the product already formed. The separating of the filaments 24 one from the other is assisted by the rubbing action of the gate tension deviced 27 on the filaments, the action setting up electrification which brings about mutual repulsion of the filaments. Such electrification is particularly pronounced in the case of filaments of cellulose acetate. With such filaments the gate tension device 27 may be metallic, and one or both of the feed rollers 28, 29 may be clothed with gutta-percha in order to ensure that by the time they reach the nozzle the filaments contain an adequate electrostatic charge. It is found that the electrification of filaments of cellulose acetate is enhanced by applying French chalk to the feed rollers.

A substantially regular degree of electrification of the filaments 24 may be maintained by traversing the filaments to and fro along the length of the feed rollers. Thus, as shown in Fig. 1 the tension device 27 is mounted on an arm 60 which is pivoted at 61 on the machine frame and caused to oscillate by a reciprocating traverse bar 62 which engages a lug 63 formed on the arm. The outer end of the arm 60 is supported by and slides on the edge of a member 64 of the machine frame. Such traversing of the filaments 24, in addition to maintaining the electrification of the filaments, prevents undue wear on any one portion of the rollers 28, 29.

The length of fiber is determined by the length of filaments 24 fed by the rollers 28, 29 between consecutive operations of the cutting device 41 and may be adjusted in amounts up to a length substantially equalling the periphery of the drum 1. The overlap of one group of fibers with the preceding group is controlled by suitably adjusting the rate at which the product is drawn from the drum 1 in relation to the frequency of cutting. Thus, for example, if 4-inch fibers are delivered to the drum and 2 inches of product are drawn from the drum, 2 inches of one group of fibers overlaps 2 inches of the preceding group, with the result that the product is substantially twice the weight of the bundle of filaments 24.

In general, the denier of the product depends on the denier of the bundle of filaments and the degree to which the fiber groups overlap each other. With a bundle of filaments of fine denier and with little overlapping of the groups formed therefrom a product of fine denier is produced, and vice versa. The denier of the product may be maintained near to that of the continuous filaments by forming long fibers and withdrawing them from the drum at a high rate as compared with the frequency at which the fiber groups are fed to the drum so that the degree of overlap of the fibers represents only a small fraction of their length.

Figure 11:
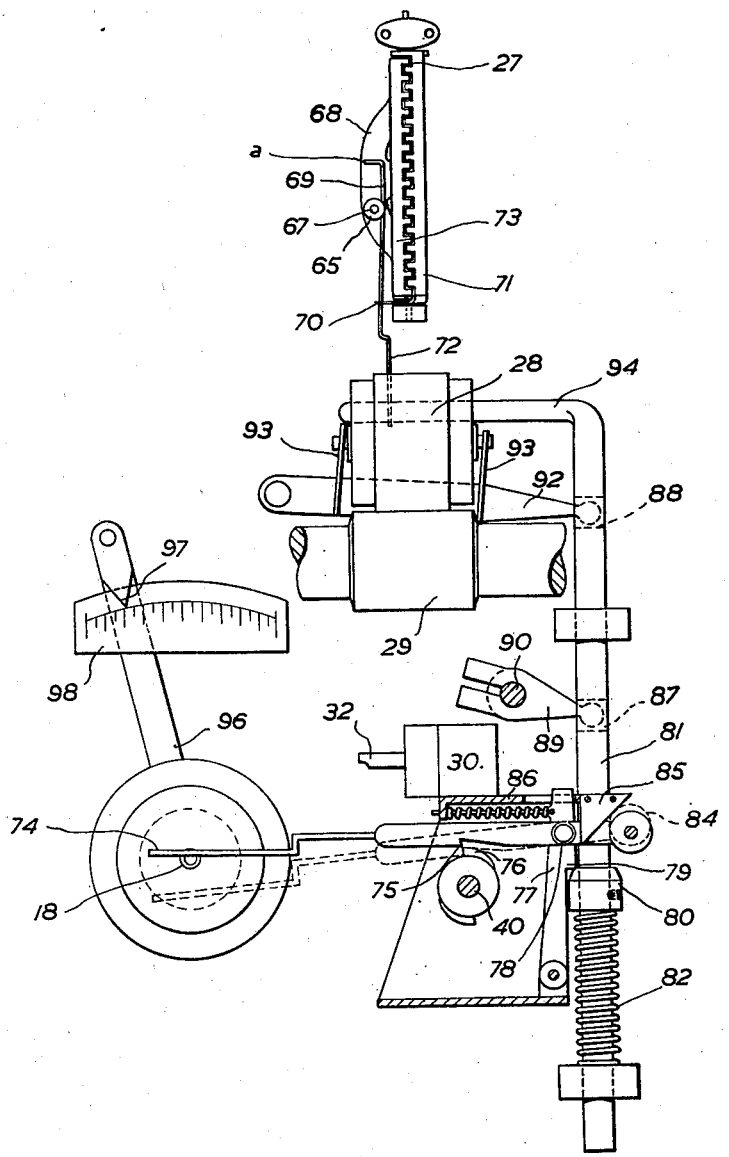

The amount of twist imparted to the product 52 depends upon the rate of rotation of the drum 1 in relation to the rate at which the product is withdrawn from the drum by the rollers 53, 54. The direction of the twist imparted to the product depends on the direction of rotation of the drum 1, clockwise rotation of the drum (as seen in Figs. 11 and 12) producing a product in which the twist runs from right to left, and anti-clockwise rotation of the drum producing a twist which runs from left to right. The provision of the casing 22 prevents the air blast issuing from the nozzle 32 impinging on the surface of the drum and possibly disturbing the fibers lying on such surface. Consequently, the apparatus can function at a high rate while maintaining the fibers under adequate control.

Higher twist may be inserted in the product 52 by giving the drum 1 two or more revolutions for each operation of the cutting device 41. That is to say, each group of fibers may be given two or more complete twists before the ends of the succeeding group of fibers are brought into contact with the twisted group.

The pressure to which the filaments 24 are subjected in the gate tension device 27 is controlled by a nut 65 which regulates the pressure of a spring 66 surrounding a screw 67 projecting from the frame 68 of the tension device. The spring 66 bears against a wire 69 which is bent to encircle the screw 67, the upper end of the wire being bent so as to contact with the frame 68, and the lower end passing through an extension 70 of the movable gate 71 of the device and passing to the left to form a tail 72, as shown clearly in Fig. 1. The wire 69 thus forms a lever of the third order, of which the fulcrum is at $a$, the effort applied at $b$ and the load is at $c$, the effort applied by the spring 66 producing relatively light pressure between the movable gate 71 and the fixed gate 73 in the ratio of $ac:ab$.

In the event of the product 52 breaking, a stop motion becomes operative to prevent further feeding of the filaments and to stop the rotation of the drum 1 and associated mechanism. A feeler finger 74 is held raised by the product 52 leaving the tube 16 (see Figs. 11 and 12). If the product breaks the finger is allowed to fall into the position shown dotted in Fig. 11 and a catch 75 formed therein is engaged by a tooth 76 revolving with the cam-shaft 40, causing the finger to be moved bodily to the left and carry with it a lever 77 on which the finger is pivoted at 78. A catch 79 on the lever 77 is thus withdrawn from a tapered collar 80 on a vertical rod 81 allowing a spring 82 to propel the rod vertically.

As the finger 74 falls into the low position, a roller 84 carried at its end is brought into contact with a cam 85 secured to a plate 86. The subsequent bodily movement of the finger, under the influence of the tooth 76, causes the roller 84 to run down the cam and thus tilt the finger to the position shown in Fig. 12 in order to allow of unobstructed threading-up of the product 52, the finger being held in the tilted position as long as the lever 77 is held in the displaced position by the collar 80 on the rod 81.

Near its upper end, the rod 81 is slotted transversely at two points 87, 88. The slot 87 engages the end of a finger 89 which is secured to a spindle 90 carrying an arm 91 (see Fig. 1). The upward movement of the rod 81 swings the finger 89 which thus rotates the spindle 90 and brings the arm 91 into contact with the clutch 8 which is thereupon disengaged to disconnect the drive to the drum 1. The front end of the spindle 90 is bent to form a handle 192 for manually controlling the rod 81.

The uppermost slot 88 engages the end of a lever 92 carrying a cradle 93 for the roller 28. The upward movement of the rod thus lifts the roller 28 out of contact with the roller 29 and in this manner stops the feeding of the filaments 24 (see Fig. 12).

The upper end of the rod 81 is bent horizontally to form a member 94 which lies beneath and in close proximity to the tail 72 of the bent wire 69. The upward movement of the rod 81 causes the member 94 to press upwardly against the tail 72 at d, the tail thereupon being moved to the position shown in dotted lines in Fig. 1. The wire 59 is thus converted to a lever of the second order of which the fulcrum is at b (brought by the movement of the wire to a point nearer the nut 65), the load at c, and the effort applied at d, the effort applied by the member 94 considerably increasing the pressure between the gates 71, 73, in the ratio of bc:bd. The pressure is such as to lock together the members 71, 73 of the tension device, thereby preventing the passage through the device of any filaments 24 which may otherwise tend to wind idly around the roller 29.

When the breakage in the product 52 is repaired the handle 192 is rotated to restart the machine, the one movement of the handle engaging the clutch 8 to re-establish the drive to the drum 1 and associated mechanism, and lowering the rod 81 so as both to reset the finger 74 and associated stop mechanism in the operative position shown in full lines in Fig. 11 and to release the tail 72 of the wire 69 so as to allow the tension device 27 to operate in the normal manner.

Figure 2:
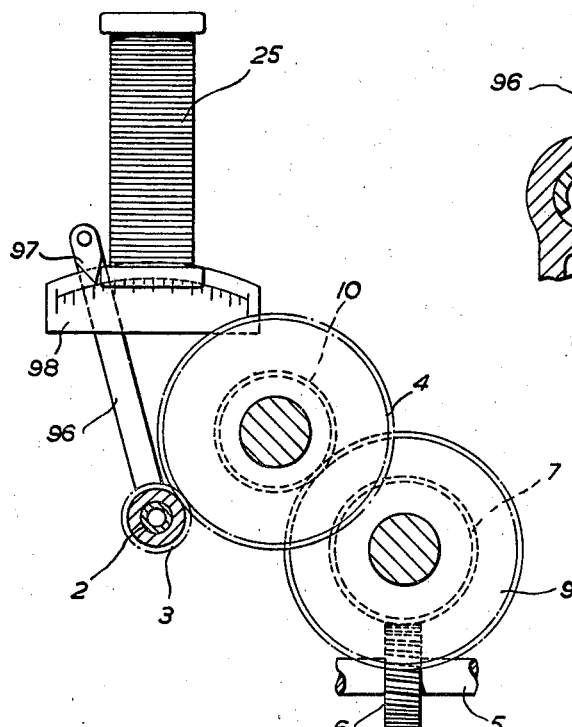
Fig. 2 is a front elevation of the driving gear for the drum and associated mechanisms.
Figure 3:
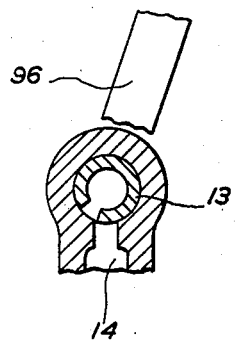
Fig. 3 is a part cross-sectional rear elevation of a detail of Fig. 2.

In order to regulate the degree of suction to which the interior of the drum 1 is subjected, the valve 13 may be rotated by lever 96 (Figs. 1-3) to open or close the valve in a manner apparent from Fig. 3. The upper end of the lever 96 is formed with a pointer 97 which slides over a graduated scale 98 and thus indicates the position of the valve.

Referring to Fig. 16 a sliver, slubbing or roving 100 (hereinafter referred to for convenience as a "roving") of natural or artificial fibers unwinding from a bobbin 101 passes over a guide 102 to two sets of nip rollers 103, 104. The nip rollers are driven in a manner such that groups of separated fibers 105 are drawn from the end of the roving by the rollers 104 which feed the fibers to the drum 1 through the opening 23 in the casing 22.

The size (or number of fibers) of each group drawn from the roving 100 by the rollers 104 depends on the count or denier of the roving and the relative rates of rotation of the pairs of nip rollers 103, 104. Thus, the roller speeds may be adjusted so that the roving is subjected to an appreciable degree of draft on passing between the rollers, the fiber groups fed to the drum thus being of a size commensurate with the count or denier of the drafted roving. With the roller speeds adjusted so as merely to loosen the fibers of the roving, on the other hand, the groups fed to the drum contain a correspondingly greater number of fibers.

In the manner described above, the succession of groups of fibers 105 overlap and are twisted into a coherent continuous product by the drum 1, the product being drawn from the tube 16 by rollers 53, 54 and wound into a package 55 as explained with reference to Fig. 1.

It will be understood that stopping mechanism e. g. similar to that described with reference to the preceding figures could be incorporated in the apparatus to bring it to rest on breakage of the continuous product.

Figs. 17 and 18 illustrate diagrammatically the use of a single drum to form one or two separate products from two or more separate successions of groups of fibers fed to a corresponding number of collecting points on the peripheral surface of the drum. Thus, to form one product the drum 121 (Fig. 17) is provided with two flared openings 17 each leading through a tube 106 to a common outlet tube 107 disposed coaxially with the drum. Groups of fibers 125 fed by two devices 130 are collected on the drum 121, in the manner described above, and each succession of groups is conducted along the respective tube 106 to the common tube 107. Each succession of groups is formed into a continuous product while passing along the tubes and both products are twisted together and formed into a unitary product before leaving the common tube 107. While the drum illustrated contains two tubes 106 only, it will be understood that it can be formed with any convenient number of tubes for the reception of a corresponding number of separate successions of groups of fibers.

To form two separate staple fiber products the drum 131 of Fig. 18 may be employed. In this case, the drum 131 is formed with two flared openings 117, each connected to a separate tube 108, 109, the tube 108 leading to the left-hand side of the drum while the tube 109 leads to the right hand side of the drum, each along the axis of the drum, the two staple fiber products thus being maintained separate for withdrawal from opposite sides of the drum.

The drum is rotatably mounted in bearings 110 supported by standards 111, and is driven by a chain sprocket 112 secured to a neck 113 formed on the left hand side of the drum. The end of the neck 113 connects with a stationary T-shaped suction pipe 114 through a stuffing box 115, a similar closure 116 preventing the ingress of air between the end of the tube 108 and the end of the suction pipe 114.

While two flared openings 17 only are illustrated it will be understood that the axial portion of each tube 108, 109 can be connected with any convenient number of flared openings 17 for the reception of a corresponding number of separate successions of groups of fibers to be converted into a unitary product.

The apparatus illustrated in Figs. 17 and 18 can be employed for the production of staple fiber products from groups of fibers drawn from rovings (in the manner shown in Fig. 16) or cut from continuous filaments, with equal facility.

Having particularly described my invention, what I desire to secure by Letters Patent is:

1. Process for the manufacture of staple fiber products, which consists in continuously converting a substantially twistless bundle of associated continuous filaments into a staple fiber product by feeding the bundle towards a rotating drum, separating the filaments of the bundle from each other at the end of the bundle, obtaining from such separated filaments a succession of groups of separated fibers of predetermined length by a cutting operation, holding each group of cut fibers to the peripheral surface of the rotating drum by means of suction, and withdrawing the succession of groups of fibers through a passage leading the final product to the axis of the drum, the rates of feeding and withdrawal being such that the forward ends of fibers of each group extend beyond the rearward ends of fibers of the preceding group to such an extent that the twist inserted by the rotation of the drum unites the successive groups of fibers into a continuous twisted staple fiber product.

2. Process for the manufacture of staple fiber products, which consists in continuously converting a substantially twistless bundle of associated continuous filaments of artificial material into a staple fiber product by feeding the bundle towards a rotating drum, separating the filaments of the bundle from each other at the end of the bundle, obtaining from such separated filaments a succession of groups of separated fibers of predetermined length by a cutting operation, holding each group of cut fibers to the peripheral surface of the rotating drum by means of suction, and withdrawing the succession of groups of fibers through a passage leading the final product to the axis of the drum, the rates of feeding and withdrawal being such that the forward ends of fibers of each group extend beyond the rearward ends of fibers of the preceding group to such an extent that the twist inserted by the rotation of the drum unites the successive groups of fibers into a continuous twisted staple fiber product.

3. Process for the manufacture of staple fiber products, which consists in continuously converting a substantially twistless bundle of associated continuous filaments of cellulose acetate into a staple fiber product by feeding the bundle towards a rotating drum, separating the filaments of the bundle from each other at the end of the bundle, obtaining from such separated filaments a succession of groups of separated fibers of predetermined length by a cutting operation, holding each group of cut fibers to the peripheral surface of the rotating drum by means of suction, and withdrawing the succession of groups of fibers through a passage leading the final product to the axis of the drum, the rates of feeding and withdrawal being such that the forward ends of fibers of each group extend beyond the rearward ends of fibers of the preceding group to such an extent that the twist inserted by the rotation of the drum unites the successive groups of fibers into a continuous twisted staple fiber product.

4. Process for the manufacture of staple fiber products, which consists in continuously converting a substantially twistless bundle of associated continuous filaments into a staple fiber product by feeding the bundle towards a rotating drum, subjecting the end of the bundle to the action of a gaseous blast so as to separate the filaments of the bundle from each other at the end of the bundle, obtaining from such separated filaments a succession of groups of separated fibers of predetermined length by a cutting operation, holding each group of cut fibers to the peripheral surface of the rotating drum by means of suction, and withdrawing the succession of groups of fibers through a passage leading the final product to the axis of the drum, the rates of feeding and withdrawal being such that the forward ends of fibers of each group extend beyond the rearward ends of fibers of the preceding group to such an extent that the twist inserted by the rotation of the drum unites the successive groups of fibers into a continuous twisted staple fiber product.

5. Process for the manufacture of staple fiber products, which consists in continuously converting a substantially twistless bundle of associated continuous filaments into a staple fiber product by feeding the bundle towards a rotating drum, subjecting the end of the bundle to the action of a gaseous blast so as to separate the filaments of the bundle from each other at the end of the bundle, cutting such separated filaments obliquely across the width of the bundle to yield a group of separated, staggered fibers of predetermined length, and repeating these operations so as to obtain a succession of such groups of fibers, holding each group of cut fibers to the peripheral surface of the rotating drum by means of suction, and withdrawing the succession of groups of fibers through a passage leading the final product to the axis of the drum, the rates of feeding and withdrawal being such that the forward ends of fibers of each group extend beyond the rearward ends of fibers of the preceding group to such an extent that the twist inserted by the rotation of the drum unites the successive groups of fibers into a continuous twisted staple fiber product.

6. Process for the manufacture of staple fiber products, which consists in continuously converting a substantially twistless bundle of associated continuous filaments into a staple fiber product by feeding the bundle towards a rotating drum, electrifying the bundle to cause mutual repulsion and spreading of the filaments, separating the spreading filaments of the bundle from each other at the end of the bundle, obtaining from such separated filaments a succession of groups of separated fibers of predetermined length by a cutting operation, holding each group of cut fibers to the peripheral surface of the rotating drum by means of suction, and withdrawing the succession of groups of fibers through a passage leading the final product to the axis of the drum, the rates of feeding and withdrawal being such that the forward ends of fibers of each group extend beyond the rearward ends of fibers of the preceding group to such an extent that the twist inserted by the rotation of the drum unites the successive groups of fibers into a continuous twisted staple fiber product.

7. Process for the manufacture of staple fiber products, which consists in continuously converting a plurality of substantially twistless bundles of associated continuous filaments into a staple fiber product by feeding the bundles towards a plurality of collecting points on the peripheral surface of a rotating drum, separating the filaments of each bundle from each other at the end of the bundle, obtaining from each such set of separated filaments a succession of groups of separated fibers of predetermined length by a cutting operation, holding each group of cut fibers to the appropriate collecting point by means of suction, and withdrawing the successions of groups of fibers through passages leading the fibers from the collecting points to the axis of the drum, the rates of feeding and withdrawal being such that the forward ends of fibers of each group of a succession extend beyond the rearward ends of fibers of the preceding group in the same succession to such an extent that the twist inserted by the rotation of the drum unites the successive groups of fibers of each succession into a continuous twisted staple fiber product and at the same time twists the products into a single staple fiber product.

8. Process for the manufacture of staple fiber products, which consists in continuously converting two substantially twistless bundles of associated continuous filaments into a staple fiber product by feeding the bundles towards two collecting points on the peripheral surface of a rotating drum, separating the filaments of each bundle from each other at the end of the bundle, obtaining from each of the two sets of separated filaments a succession of groups of separated fibers of predetermined length by a cutting operation, holding each group of cut fibers to the appropriate collecting point by means of suction, leading the two successions of groups of fibers each through a separate passage to the axis of the drum, and withdrawing the successions of groups at opposite sides of the drum, the rates of feeding and withdrawal being such that the forward ends of fibers of each group of a succession extend beyond the rearward ends of fibers of the preceding group in the same succession to such an extent that the twist inserted by the rotation of the drum unites the successive groups of fibers of each succession into a continuous twisted staple fiber product.

9. Apparatus for the manufacture of staple fiber products, comprising a rotatable drum, means for rotating the drum, means by which suction can be applied to the interior of the drum, a passage terminating at one end in an opening in the peripheral surface of the drum and serving to lead the final product to the axis of the drum, the surface of the drum being permeable at least in the neighborhood of said opening, means for feeding a bundle of continuous filaments towards the drum, means for separating the filaments of the bundle from each other at the end of the bundle, a cutting device adapted to cut from the separated filaments a succession of groups of separated fibers of predetermined length that can be held to the surface of the drum by the suction, and means for withdrawing from the axis of the drum the continuous twisted staple fiber product produced by the rotation of the drum operating on the successive groups of fibers held to the surface of the drum.

10. Apparatus for the manufacture of staple fiber products, comprising a rotatable drum, means for rotating the drum, means by which suction can be applied to the interior of the drum, a passage terminating at one end in an opening in the peripheral surface of the drum and serving to lead the final product to the axis of the drum, the surface of the drum being permeable at least in the neighborhood of said opening, means for feeding a bundle of continuous filaments towards the drum, an ejector nozzle adapted to receive the end of the bundle and to apply thereto a gaseous blast so as both to separate the filaments at the end of the bundle from each other and to forward the filaments towards the surface of the drum, a cutting device disposed near the path of the blast produced by the nozzle and adapted to cut from the forwarded filaments a succession of groups of separated fibers of predetermined length that can be held to the surface of the drum by the suction, and means for withdrawing from the axis of the drum the continuous twisted staple fiber product produced by the rotation of the drum operating on the successive groups of fibers held to the surface of the drum.

11. Apparatus for the manufacture of staple fiber products, comprising a rotatable drum, means for rotating the drum, means by which suction can be applied to the interior of the drum, a passage terminating at one end in an opening in the peripheral surface of the drum and serving to lead the final product to the axis of the drum, the surface of the drum being permeable at least in the neighborhood of said opening, a stationary casing surrounding the drum and formed with an opening in its surface, means for feeding a bundle of continuous filaments towards the drum, an ejector nozzle adapted to receive the end of the bundle and to apply thereto a gaseous blast so as both to separate the filaments at the end of the bundle from each other and to forward the filaments towards the surface of the drum through the opening in the casing, a cutting device disposed near the path of the blast produced by the nozzle and adapted to cut from the forwarded filaments a succession of groups of separated fibers of predetermined length that can be held to the surface of the drum by the suction, and means for withdrawing from the axis of the drum the continuous twisted staple fiber product produced by the rotation of the drum operating on the successive groups of fibers held to the surface of the drum.

12. Apparatus for the manufacture of staple fiber products, comprising a rotatable drum, means for rotating the drum, means by which suction can be applied to the interior of the drum, a passage terminating at one end in an opening in the peripheral surface of the drum, and serving to lead the final product to the axis of the drum, the surface of the drum being permeable at least in the neighborhood of said opening, means for feeding a bundle of continuous filaments towards the surface of the drum, means for separating the filaments of the bundle from each other at the end of the bundle, a cutting device adapted to cut from the separated filaments a succession of groups of separated fibers of predetermined length that can be held to the surface of the drum by the suction, means for withdrawing from the axis of the drum the continuous twisted staple fiber product produced by the rotation of the drum operating on the successive groups of fibers held to the surface of the drum, a feeler normally restrained by the product leaving the drum, and means controlled by the feeler for rendering the filament-feeding means inoperative on breakage of the product.

13. Apparatus for the manufacture of staple fiber products, comprising a rotatable drum, means for rotating the drum, a clutch incorporated in said drum-rotating means, means by which suction can be applied to the interior of the drum, a passage terminating at one end in an opening in the peripheral surface of the drum and serving to lead the final product to the axis of the drum, the surface of the drum being permeable at least in the neighborhood of said opening, means for feeding a bundle of continuous filaments towards the surface of the drum, means for separating the filaments of the bundle from each other at the end of the bundle, a cutting device adapted to cut from the separated filaments a succession of groups of separated fibers of predetermined length that can be held to the surface of the drum by the suction, means for withdrawing from the axis of the drum the continuous twisted staple fiber product produced by the rotation of the drum operating on the successive groups of fibers held to the surface of the drum, a feeler normally restrained by the product leaving the drum, and means controlled by the feeler for disengaging the clutch in the drum-rotating means on breakage of the product.

14. Apparatus for the manufacture of staple fiber products, comprising a rotatable drum, means for rotating the drum, a clutch incorporated in said drum-rotating means, means by which suction can be applied to the interior of the drum, a passage terminating at one end in an opening in the peripheral surface of the drum and serving to lead the final product to the axis of the drum, the surface of the drum being permeable at least in the neighborhood of said opening, means for feeding a bundle of continuous filaments towards the surface of the drum, means for separating the filaments of the bundle from each other at the end of the bundle, a cutting device adapted to cut from the separated filaments a succession of groups of separated fibers of predetermined length that can be held to the surface of the drum by the suction, means for withdrawing from the axis of the drum the continuous twisted staple fiber product produced by the rotation of the drum operating on the successive groups of fibers held to the surface of the drum, a feeler normally restrained by the product leaving the drum, and means controlled by the feeler and adapted both to render the filament-feeding means inoperative and to disengage the clutch in the drum-rotating means on breakage of the product.

15. Apparatus for the manufacture of staple fiber products, comprising a rotatable drum, means for rotating the drum, means by which suction can be applied to the interior of the drum, a passage terminating at one end in an opening in the peripheral surface of the drum and serving to lead the final product to the axis of the drum, the surface of the drum being permeable at least in the neighborhood of said opening, means for feeding a bundle of continuous filaments towards the drum, means for separating the filaments of the bundle from each other at the end of the bundle, a cutting device adapted to cut from the separated filaments a succession of groups of separated fibers of predetermined length that can be held to the surface of the drum by the suction, means for drawing the continuous filaments clear of the cutting device after the cutting of each group of fibers, and means for withdrawing from the axis of the drum the continuous twisted staple fiber product produced by the rotation of the drum operating on the successive groups of fibers held to the surface of the drum.

16. Apparatus for the manufacture of staple fiber products, comprising a rotatable drum, means for rotating the drum, means by which suction can be applied to the interior of the drum, a passage terminating at one end in an opening in the peripheral surface of the drum and serving to lead the final product to the axis of the drum, the surface of the drum being permeable at least in the neighborhood of said opening, means for feeding a bundle of continuous filaments towards the drum, a "gate" tension device disposed in the path of the filaments so as to impart tension to the filaments prior to their engagement with the feeding means, means for separating the filaments of the bundle from each other at the end of the bundle, a cutting device adapted to cut from the separated filaments a succession of groups of separated fibers of predetermined length that can be held to the surface of the drum by the suction, and means for withdrawing from the axis of the drum the continuous twisted staple fiber product produced by the rotation of the drum operating on the successive groups of fibers held to the surface of the drum.

17. Process for the manufacture of staple fiber products, which consists in successively feeding forward fibers to the outer surface of a rotating member and drawing the fibers continuously from and through said outer surface of the member to the axis of its rotation so that the rotation causes twist to be inserted in the continuous fibrous structure.

18. Process for the manufacture of staple fiber products which consists in successively feeding forward fibers to the outer surface of a rotating member having a passage running lengthwise of its axis, and drawing the fibers continuously from and through said outer surface of the member into and through the passage so that the rotation causes twist to be inserted in the continuous fibrous structure.

19. Process for the manufacture of staple fiber products which consists in feeding a succession of separated fibers to the outer surface of a rotating member, applying suction to the fibers to draw them from and through said outer surface and to assist them in forming a continuous fibrous structure, and drawing this continuous structure to the axis of rotation of the member so that the rotation of the member causes twist to be inserted in the continuous fibrous structure.

20. Apparatus for the manufacture of staple fiber products comprising a hollow rotatable member having holes in its periphery, means for applying suction to the interior of the member, means for feeding fibers continuously to the surface of the member, and means for drawing the fibers from the surface into the axis of rotation of the member.

21. Apparatus for the manufacture of staple fiber products according to claim 20 comprising a tube disposed in the axis of the rotatable member and adapted to receive the fibers drawn from the surface of the member.

22. Apparatus for the manufacture of staple fiber products according to claim 20 comprising a stationary casing surrounding the rotatable member and having a feed aperture for the passage of fibers to the surface of the member.

WILLIAM POOL.